US007550240B2

(12) United States Patent
Molaire et al.

(10) Patent No.: US 7,550,240 B2
(45) Date of Patent: Jun. 23, 2009

(54) NEWTONIAN, ULTRASONIC-INSENSITIVE CHARGE GENERATING LAYER DISPERSION COMPOSITION AND A METHOD FOR PRODUCING THE COMPOSITION

(75) Inventors: Michel F. Molaire, Rochester, NY (US); Jane R. Cowdery-Corvan, Webster, NY (US); Lloyd Lobo, Rochester, NY (US); Theodore Zubil, Honeoye Falls, NY (US); Edward T. Miskinis, Rochester, NY (US); Dennis R. Fronheiser, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 53 days.

(21) Appl. No.: 10/857,307

(22) Filed: May 28, 2004

(65) Prior Publication Data

US 2005/0266330 A1 Dec. 1, 2005

(51) Int. Cl.
*C08L 29/14* (2006.01)
*G03C 1/73* (2006.01)

(52) U.S. Cl. ........................ 430/70; 430/96; 430/281.1; 430/285.1; 430/541

(58) Field of Classification Search ................... 430/70, 430/96, 281.1, 285.1, 541
See application file for complete search history.

(56) References Cited

U.S. PATENT DOCUMENTS

| | | | | |
|---|---|---|---|---|
| 4,419,437 | A * | 12/1983 | Noonan et al. | 430/270.1 |
| 5,238,764 | A | 8/1993 | Molaire et al. | 430/58 |
| 5,614,342 | A | 3/1997 | Molaire et al. | 430/78 |
| 5,733,695 | A * | 3/1998 | Molaire et al. | 430/59.4 |
| 6,057,075 | A | 5/2000 | Yuh et al. | 430/135 |

OTHER PUBLICATIONS

"Measurement of Graininess For Halftone Electrophotography" by Theodore Bouk and Norman Burmingham in Proceedings of the IS&T's Eight International Congress On Advances in Non-Impact Printing Technology, p. 508, 1972.

Handbook of Solubility Parameters and Other Cohesion Parameters by Allan F. M. Barton, CRC Press, 1985.

* cited by examiner

*Primary Examiner*—Kelechi C Egwim
(74) *Attorney, Agent, or Firm*—Carl F. Ruoff

(57) ABSTRACT

This invention relates to electrophotographic elements containing a layer formed from coating compositions containing a mixture of polymeric binders, including a polyvinyl butyral and a polyester ionomer and a crystalline mixture of unsubstituted titanyl phthalocyanine pigment, titanyl phthalocyanine pigments or mixtures thereof dispersed in the mixture. More particularly the invention relates to electrophotographic elements containing photoconductive layers which are especially useful for forming a photoconductive layer that is very uniform and highly absorptive at relatively thin coverage with good inter layer adhesion. The electrophotographic elements produced using this coating composition are particularly suited for high quality applications such as providing copy images with very low grain.

8 Claims, 2 Drawing Sheets

NEWTONIAN, ULTRASONIC-INSENSITIVE CHARGE GENERATING LAYER DISPERSION COMPOSITION AND A METHOD FOR PRODUCING THE COMPOSITION

FIELD OF THE INVENTION

This invention relates to electrophotographic elements containing layers formed from Newtonian, ultrasonic-insensitive coating compositions comprising a mixture of polymeric binders, including a polyvinyl butyral and a polyester ionomer, a crystalline mixture of unsubstituted phthalocyanine and titanium phthalocyanine pigments or co-crystal mixtures thereof dispersed in the mixture. The coating compositions are especially useful for forming a photoconductive layer that is very uniform and highly absorptive at relatively thin coverage with good interlayer adhesion. The electrophotographic elements produced using this coating composition are particularly suited for high quality applications such as providing copy images with very low grain.

BACKGROUND OF THE INVENTION

Dual layer electrophotographic elements using a light sensitive pigment dispersed in a polymeric binder have gained widespread use in commercial copiers and printers, especially those using a laser or LED as the digital light for the exposure. One class of pigment widely used is phthalocyanine. The pigments are coated from dispersions typically comprising the pigment, a binder, solvent and surfactants. The coating dispersion requirements are numerous. Besides the functional requirement of light sensitivity, the coated layers need to be uniform and need to adhere to adjacent layers and be stable for thousands of cycles. For dip coating applications and the like, the pigment coating dispersion needs to be free of flocculation at the time of coating.

In general practice, pigment-coating dispersions may be left unused for a period of time between coating operations. With the passage of time, even the most stable coating dispersion will flocculate to some extent. For high quality applications minimum flocculation at the time of coating is problematic. Desirably, it should be possible to redisperse the coating composition by some practical means such as on-line ultrasound (sonication) or high shear energy, both of which are typically used. Thus it is essential that the coating dispersion be stable through these treatments.

The stability of particulate dispersions depends on the ability to disperse the particles in the presence of a stabilizer and to provide access for the stabilizer molecules to adsorb to the pigment surface. If the dispersion process is inadequate, agglomerates will be present. These larger size aggregates are sensitive to high-energy dispersion processes, such as ultrasound. The momentum of the aggregates imparted by the high energy can result in collisions between aggregates to form larger aggregates and ultimately destabilize the dispersion. If the dispersion is finely divided into primary particles or relatively small aggregates, ultrasound will not negatively impact the aggregate size or will actually break up the aggregates into smaller sizes.

There are several factors that influence the stability of the dispersions. These include the dispersing energy (milling time and intensity), the adsorption energy of the stabilizing entity to the particle surface, the molecular weight of the stabilizer (this influences the adsorption kinetics as well as the steric stabilization). If the coating solution contains more than one soluble entity (i.e. two or more polymers), at least one of them should adsorb to the particle surface to provide stability. In this case it may be beneficial to carry out the dispersion step in the presence of the adsorbing polymer alone and subsequently add the non-adsorbing polymer.

The presence of aggregates affects the coating process as well as the quality of the final coating. Particularly in processes like dip coating and ring coating, the amount of fluid deposited is a strong function of its viscosity. The state of the dispersion directly impacts the viscosity, particularly at low shear rates. If the dispersion is flocculated, the aggregates are constantly being destroyed and reformed at the low shear rates. The energy dissipated in breaking up the flocculants manifests as a higher viscosity. (At high shear rates, the time constant of flocculation formation is longer than the rate of fluid deformation, thereby having a lower impact on viscosity at these rates). Thus, the rheological profile of an unstable dispersion is highly shear thinning and tends towards an infinite viscosity as the shear rate approaches zero, i.e., the presence of a yield stress according to the Herschel-Buckley equation. The effect of sonication on these dispersions is to make the aggregates larger and increase the shear thinning behavior. Stable dispersions can also exhibit shear thinning behavior, particularly when the volume fraction of the dispersed phase is greater than 0.2. In the case of stable dispersions, the viscosity tends to level off at low shear rates as opposed to the climb exhibited by unstable dispersions.

Most coating operations, particularly dip coating operations, are carried out at relatively low solids content (less than 5%) in the coating fluid. At this solids concentration, stable unflocculated dispersions are expected to show Newtonian behavior. Newtonian behavior is defined as a dispersion in which the viscosity does not change with the shear rate. When sonication is used to redisperse such solutions, it is desirable that the sonication not change the rheological behavior significantly. Unfortunately it has been observed that in many instances the application of sonification does result in detrimental changes in the rheological behavior of the dispersion.

In U.S. Pat. No. 5,238,764, Molaire, et al described a method of making a dispersion of titanyl fluorophthalocyanine (TiFOPc) consisting of: milling the pigment in the presence of MAKROLON (trademark of General Electric Company, Schenectady, N.Y.), a polycarbonate binder, and a solvent using steel shot for three days, separating the pigment grind from the steel shot; and, adding the isolated mill grind to another preformed solution containing another polycarbonate binder (LEXAN, a trademark of General Electric Company, Schenectady, N.Y.), a polyester binder, and two aggregating dyes, to form a coating composition. The dried layer thickness obtained from the coating composition was about five microns.

Molaire et al, in U.S. Pat. No. 5,614,342 described a process of making a dispersion of a co-crystalline mixture of titanyl phthalocyanine (TiOPc), and TiOFPc consisting of milling the co-crystalline pigment mixture in the presence of a polyester and tetrahydrofuran solvent, using 2 mm steel shot in a Sweco Vibro Energy grinding mill; removing the steel shot; and, adding the resulting pigment dispersion to a solution of the same polyester in the same solvent to provide a coating composition, used to coat a 0.5-micron thick charge generation layer.

In U.S. Pat. No. 5,733,695, Molaire, et al. disclosed the use of certain polyester ionomers as a binder for charge generation layer (CGL) dispersions. The polyester ionomers were demonstrated to impact excellent interlayer adhesion to the coated CGL.

In U.S. Pat. No. 6,057,075, Yuh, et al. describes a method for fabricating a photoreceptor including preparing a first stable coating dispersion including a solvent, a first polymer, and a charge generating material; and diluting the concentration of the charge generating material by adding an amount of a second polymer to the first stable coating dispersion without losing the dispersion stability thereof, thereby resulting in a second stable coating dispersion. Preferred binders include polyvinyl butyral with hydroxyl content greater than about 17%, and molecular weight from about 90,000 to about 250,000. U.S. Pat. No. 6,057,075 discloses the preferred rheological behavior of CGL coating solutions.

The foregoing patents are hereby incorporated in their entirety by reference.

The general equation that describes particulate solutions is the Herschel-Buckley equation: $\tau=\tau_0+m\gamma^{P-1}$ where $\tau$ is the shear stress, $\gamma$ is the shear rate, m is a constant obtained by fitting and P is the power law index. $\tau 0$ is the yield stress that is usually present when the particles are flocculated to form a network structure. In the absence of any yield stress, the equation becomes:

$$\tau=m\gamma^{P-1}$$

According to U.S. Pat. No. 6,057,075, if the solution has no yield stress and has a power law index over 0.9 (1.0 being Newtonian), the solution is stable. Some of the stable solutions disclosed in U.S. Pat. No. 6,057,075 have power law index values as low as 0.92. However, it has been found that solutions that are Newtonian or close to Newtonian (P>0.99), while apparently stable, may be degraded upon being subjected to sonication. For coating solutions where the solids concentration is less than 5%, if the ratio of the low shear viscosity (0.5 s-1) and the high shear viscosity (3000 s-1) is greater than 3.0, it is indicative of a flocculated system and sonication will degrade the solution. In some instances, particularly when the solids concentration is less than 3%, even if the ratio is close to 1, it may not be immune to sonication and results in the rheology becoming non-Newtonian after sonication. Thus, it is desirable to have CGL solutions to have low shear thinning properties upon preparation, but to also retain or improve its shear thinning properties after sonication.

SUMMARY OF THE INVENTION

The present invention comprises a Newtonian, ultrasonic-insensitive charge generation dispersion composition comprising at least one finely-divided pigment, polyvinyl butyral (PVB) and a polyester ionomer wherein the composition has a low shear viscosity to high shear viscosity ratio from about 1 to about 3.0 where the low shear rate is defined as 0.5 s-1 (sec-1) and the high shear rate is a value greater than 1000 s-1 to about 3000 s-1 and wherein the composition retains or decreases the low viscosity to high viscosity ratio after sonication.

The present invention further comprises a method for producing a Newtonian, ultrasonic-insensitive charge generation dispersion composition, the composition comprising at least one finely-divided pigment, PVB and a polyester ionomer, the method comprising; milling at least one finely-divided pigment and PVB at a milling speed for a time sufficient to produce the Newtonian, ultrasonic-insensitive charge generation dispersion composition.

DESCRIPTION OF PREFERRED EMBODIMENTS

Figure 1:
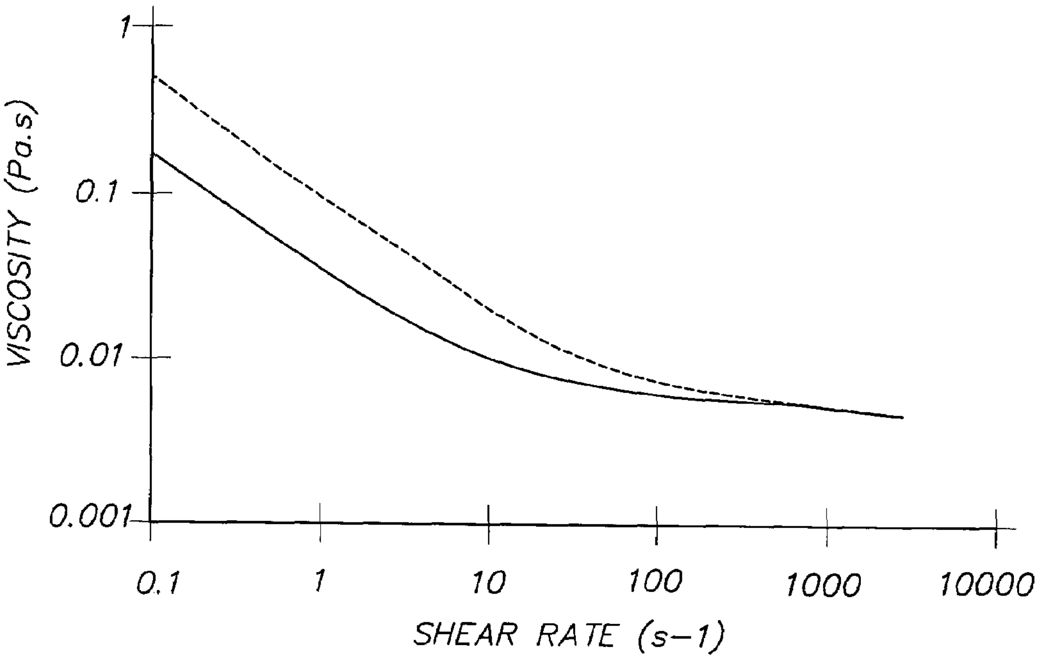
FIG. 1 is a graph showing the viscosity versus shear rate for a non-Newtonian solution. The solid line shows an untreated coating solution and the dashed line shows a solution sonicated in a lab bath for one-hour.

According to the present invention, it has been found that particularly the milling technique and conditions are important to ensure coating dispersions that are not only stable for a significant amount of time but which can also be redispersed by shear or ultrasonic energy without a detrimental affect to the coated layers.

In particular this invention has improved the methods of U.S. Pat. Nos. 5,614,342, 5,238,764 and 5,733,695, previously incorporated by reference. In these patents, a method for producing dispersions containing crystals of titanium phthalocyanine, titanium fluorophthalocyanine and mixtures thereof has been shown. The process basically comprises milling the pigment in the presence of a first binder and letting down the dispersion in the solution of a similar or different binder. The pigment to binder ratio is kept as high as possible. It has now been found that the production of stable dispersions depends not only on the solvent and the binder molecular structure but also on the total amount of energy exercised on the coating mixture. In particular the milling time and milling rate (rpm) are chosen to bring a particular coating mixture to a stable dispersion.

The present invention comprises the treatment of a charge generation dispersion composition comprising at least one finely divided pigment and a PVB to produce a Newtonian ultrasonic-insensitive charge-generation dispersion composition. Desirably the composition also contains a polyester ionomer. The composition is characterized by the rheological profile measured over a shear rate range from 0.1 s-1 to above 1000 s-1 wherein the viscosity ratio defined as the ratio of the viscosities measured at shear rates of 0.5 s-1 to above 1000 s-1, has a value from 1 to 3.0, which upon sonication results in either the same ratio or a decrease in the viscosity ratio upon sonication. The viscosity ratio of the solution after sonication should have a value from 1 to 1.5

The pigments used are typically present in the composition in an amount equal to about 30 to about 80 weight percent (wt %) based upon the weight of the total solid content of the coating composition and more preferably in an amount equal to from about 50 to about 70 wt %.

The PVB is a copolymer with butyral, vinyl alcohol and vinyl acetate moieties. The vinyl alcohol is desirably present in a quantity of about 5 to about 20 mole percent (mole %) of the copolymer with the vinyl acetate being present in an amount typically from about 0.5 to about 5 mole %. The copolymer may comprise from about 75 to about 90 mole % butyral, about 7.5 to about 19 mole % vinyl alcohol and from about 1 to about 3 mole % vinyl acetate. Desirably, the average molecular weight of the copolymer is from about 10,000 to about 170,000 Daltons. The PVB copolymer is desirably present in the composition in an amount equal to from about 2 to about 40 wt % based on the weight of the total solid content of the composition.

The composition also includes at least one of titanium phthalocyanine, titanium fluorophthalocyanine and mixtures thereof. The composition further contains a polyester ionomer present in the coating composition in an amount equal to from about 60 to about 98 wt % based upon the weight of the total solid content of the coating composition. Suitable polyester ionomers are selected from the group wherein the polyester-ionomer has a structure according to formula I:

(I)

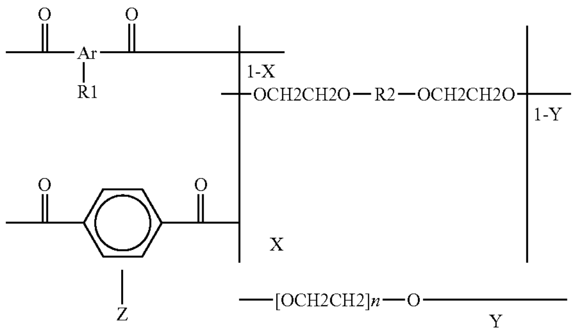

wherein R.sup.1 represents alkyl groups such as methyl, and t-butyl; R.sup.2 represents cyclohexyl, 1,4-dimethylenecyclohexane, 4,4'-benzophenone, 4,4'-diphenylmethane, diphenylsulfone, 4,4'-isopropylidene bisphenylene, 4,4'-hexafluoroisopropylidene bisphenylene, 4,4'-cyclohexylidene bisphenylene, 4,4'-norbornylidene bispheylene, 4,4'-indnylidene bisphenylene, and 4,4'-fluorenylidenebisphenylene. Ar represents an aromatic group containing an asymetric center, i.e., isophthalic acid 1,1,3-trimethyl-3(4-carboxyphenyl)-5,5-indancarboxylate, and 3-methylphthalic anhydride, methylsuccinic acid, and 2-ethyl-1,6-hexanedioic acid.

Z represents:

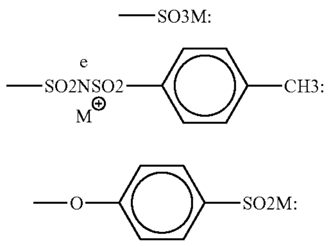

M represents an alkali earth metals such as lithium, sodium or potassium or ammonium, trimethylammonium, triethylammonium, and hydroxylalkylammonium such as dihydroxyethylammonium, and trihydroxyethylammonium; and n is an integer of from 2 to 12;

X represents from 1 to 30 mole %; and Y represents from 0 to 100 mole %.

Such polyester ionomers are described in U.S. Pat. No. 5,733,695, which is hereby incorporated in its entirety by reference.

Preferably the polyester ionomer is selected from the group consisting of:

poly{1,4-cyclohexylenedimethylene-co-2,2'-oxydiethylene (46/54)isophthlate-co-5-sodiosulfoisophthlate (95/5)!;
poly{1,4-cyclohexylenedimethylene-co-2,2'-oxydiethylene (46/54)isophthlate-co-5-sodiosulfoisophthlate (90/10)!;
poly{1,4-cyclohexylenedimethylene-co-2,2'-oxydiethylene (46/54)isophthalate-co-5-sodiosulfoisophthalate (85/15)!;
poly{1,4-cyclohexylenedimethylene-co-2,2'-oxydiethylene (46/54)isophthalate-co-5-sodiosulfoisophthalate (80/20)!;
poly{1,4-cyclohexylenedimethylene-co-2,2'-oxydiethylene (46/54)isophthalate-co-5-sodiosulfoisophthalate (75/25)!;
poly{1,4-cyclohexylenedimethylene-co-2,2'-oxydiethylene (46/54)isophthalate-co-5-lithiosulfoisophthalate (90/10)!;
poly{1,4-cyclohexylenedimethylene-co-2,2'-oxydiethylene (46/54)isophthalate-co-triphenylmethylphosphoniumsulfoisophthalate (90/10)!;
poly{1,4-cyclohexylenedimethylene-co-2,2'-oxydiethylene (46/54)isophthalate-co-5-(4-sulfophenoxy)isophthlate (90/10)};
poly{1,4-cyclohexyloxydiethylene terephthalate-co-5-(4-sulfophenoxy)isophthalate (70/30)}; and
poly{1,4-cyclohexylenedimethylene-co-2,2'-oxydiethylene (46/54)isophthalate-co-4,4'-dicarboxyphenylmethylphenyl phosphonium p-toluenesulfonate (90/10)!.

The composition is readily produced by milling at least one finely divided pigment, PVB and optionally a polyester ionomer at a milling speed for a time sufficient to produce the Newtonian ultrasonic-insensitive charge generation layer dispersion composition. The polyester ionomer may be added with mixing after milling. Desirably the milling time is selected based upon an evaluation of the products produced from a particular composition.

Polyvinyl butyral copolymers (PVB) used in the examples are shown below in Table I.

TABLE I

| PVB | % Alcohol | % Butyral | % Acetate | MW |
|---|---|---|---|---|
| BL-1 | 14.7 | 82.9 | 2.4 | 10 |
| BM-1 | 13.6 | 84 | 2.4 | 60 |
| BM-5 | 13.6 | 84 | 2.4 | 140 |
| BM-2 | 12.1 | 85.6 | 2.3 | 100 |
| BH-6 | 11.6 | 86.1 | 2.3 | 40 |
| BM-S | 8.4 | 89.4 | 2.2 | 80 |
| BL-5 | 7.6 | 90.2 | 2.2 | 30 |
| B72 | 18.9 | 80 | 1.1 | 170 |
| B76 | 12 | 88 | 0 | 90 |
| BLS | 7.6 | 89.6 | 2.8 | 10 |

The various compositions are available from Sekisui Chemicals, LTD of Japan under the trademark S-Lec, or from Solutia, under trademark BUTVAR or from Wacker Chemicals, under the trademark POLIOFORM.

These formulations are shown by the codes used by the vendor and show the composition of the PVB copolymers used in the composition.

The PVB type can be characterized by its chemical composition and its molecular weight. The chemical composition is further characterized by the relative amounts of the three moieties present-butyral, vinyl alcohol and vinyl acetate. These materials have been shown as a mole % of each monomer in Table I. This information has been obtained directly or obtained from the vendor's product literature. A selection of PVB polymers were selected based upon variations in the four main characteristics as listed in Table I.

In the selection of PVB types the butyral content varies from about 83% to 90%, the alcohol content varies from 7.6 to 19 and the MW varies from 10 to 170 K Daltons.

EXAMPLES

The following examples will describe the invention. The description of the PVB and the polyester ionomer have been discussed above. Similarly the preparation of the co-crystals has been described in some detail both as co-crystals and as crystals in the patents incorporated herein by reference.

Effect of Milling Time And RPM

Dispersion Preparation

The following procedure was used to prepare a dispersion incorporating each of the PVBs described in Table I above. A 75:25 cocrystal of titanyl phthalocyanine and fluorinated phthalocyanine (23.68 grams) was mixed with a prepared solution 5.92 g (grams) of the selected PVB in 370.4 g of 1,1,2-trichloroethane. The mixture was milled in a SZEGVARI attritor type 01 HD, size 1 in the presence of 700 cubic centimeters of 3 mm stainless steel beads. The rotor speed was set at the selected RPM for the particular experiment and the milling was run for the time called by the experiment. After the milling step, the dispersion was mixed in a trichloroethane solution of a polyester ionomer [made from isophthalic acid (95 mole %), 4-sodio-isophthalic sulfonate (5 mole %), diethylene glycol (20 mole %), and neopentyl glycol (80 mole %), in TCE, such that the coating solution had 3:00% solids concentration with the total solids composed of 50% pigment, 12.5% PVB and 37.5% polyester ionomer.

Rheological Characterization

Coating solutions prepared as described above were characterized for their rheology using a Haake viscometer. Double gap geometry was used. The sample was first sheared at 3000 s-1 for 60 seconds to break up any agglomerates. At this point the shear rate sweep was carried out between 3000 and 0.1 s-1 over 180 s. As a measure of the shear thinning behavior, the ratio of the viscosity at 3000 s-1 and 0.5 s-1 was used. A viscosity ratio less than 1.5 implies essentially Newtonian behavior. The higher the number the more shear thinning is the behavior. We also measured the change in the high shear viscosity due to sonication. This change is characterized by the ratio of the high shear viscosities after and before sonication. In all instances this ratio is less than or close to one implying that the sonication has resulted in either breaking up the aggregates or forming looser floccs, which can be broken up at high shear rates.

Effect of Sonication

A portion of the coating fluid was subjected to sonication in a lab scale Branson sonication bath, for 1 hour. A polyethylene terephthalate (PET) dip coating was made with the solution before and after sonication.

Dip Coating

A 0.5" coating strip, comprised of nickelized 7 mil PET coated with a layer of AMILAN CM8000 (obtained from Toray Engineering of Japan), is attached to a linear motor and dipped into the coating solution. It is then withdrawn at a rate of about 5 mm/sec and let dry. The dried coatings are evaluated for coating quality under the microscope.

Effect of Milling Conditions

To establish the effect of milling conditions, the dispersions outlined in Table II were made. Two different PVB compositions were used, S-Lec BM-2 PVB from Sekisui Chemical Co. LTD of Japan and BUTVAR B76 PVB from Solutia; three milling times were used, two, six and twenty-four hours; two rotor RPM speeds were used, 200 and 400. The dispersion procedure described above was used for all the examples of Table II.

TABLE II

| Example | PVB | Milling Time | Milling Speed | Viscosity Ratio Fresh | Viscosity Ratio Sonicated | High Shear Viscosity Ratio |
|---|---|---|---|---|---|---|
| 1 | B76 | 6 | 400 | 1.644 | 12.551 | 0.920 |
| 2 | B76 | 2 | 400 | 5.861 | 26.561 | 0.960 |
| 3 | B76 | 2 | 200 | 10.784 | 33.790 | 0.951 |
| 4 | B76 | 6 | 200 | 9.850 | 24.605 | 0.943 |
| 5 | B76 | 24 | 400 | 0.883 | 0.523 | 0.998 |
| 6 | BM2 | 6 | 400 | 0.457 | 0.644 | 0.864 |
| 7 | BM2 | 2 | 400 | 0.845 | 2.541 | 0.913 |
| 8 | BM2 | 6 | 200 | 1.281 | 1.257 | 0.838 |
| 9 | BM2 | 2 | 200 | 0.971 | 7.723 | 0.898 |

The relationship between the viscosity ratio of the untreated (fresh) solution and milling is quite clear. With both PVB types the milling time has the main impact and the milling speed (intensity) has the secondary impact on the rheology. As the milling time gets longer and the milling speed gets faster, the fresh viscosity ratio drops, i.e., less shear thinning. The effect of sonication is more pronounced. If the milling time is not sufficiently long (such as the case with BUTVAR B76 PVB 400 rpm, six hours vs. twenty-four hours), the untreated solutions may appear Newtonian but will turn shear thinning after sonication. To be truly insensitive to sonication, the milling time must be longer than a critical amount. This critical time changes with different PVB types. The S-Lec BM2 type PVB requires only six hours to be insensitive to sonication, whereas the BUTVAR B76 PVB type requires between six and twenty-four hours. The high shear viscosity ratio also shows that sonication further improves the dispersion quality (the ratio is between 0.8 and 0.9) while for the BUTVAR B76 PVB there is not much change.

The coating quality reflects the rheological measurements. Samples that are non-Newtonian after sonication show agglomeration and poor coating quality. With BUTVAR B76 PVB, the only sample showing uniform coating after sonication is the sample milled for twenty-four hours at 400 rpm. With S-Lec BM2 PVB, both samples milled for six hours (200 and 400 rpm) have good coating quality. The samples milled at shorter times (two hours) are agglomerated, with the lower speed milling appearing worse.

Milling in the Presence of Polyester Ionomer

The effect of milling in the presence of polyester ionomer was tested by repeating example 6 of Table II, except that the milling was carried with a 75:25 mixture of PVB S-Lec BM-2 (80 wt %) and the polyester ionomer ("SIP") (20 wt %) made from isophthalic acid (95 mole %), 4-sodio-isophthalic sulfonate (5 mole %), diethylene glycol (20 mole %) and neopentyl glycol (80 mole %). The final dispersion had a 3.5% solids concentration with the total solids composed of 50% pigment, 10% PVB and 40% polyester ionomer.

The results in Table III below show no detrimental effects.

TABLE III

| Example | PVB | Milling Time | Milling Speed | Viscosity Ratio Fresh | Viscosity Ratio Sonicated | High Shear Viscosity Ratio |
|---|---|---|---|---|---|---|
| 10 | BM2 + SIP | 6 | 400 | 0.875 | 1.119 | 0.958 |

Comparative Example 1

Coating Dispersion Incorporating Only Polyester Ionomer

A control dispersion was made according to the procedure used for example 6 of Table II except that the polyester ionomer ("SIP") [made from isophthalic acid (95 mole), 4-sodio-isophthalic sulfonate (5 mole %), diethylene glycol (20 mole %)], was used for the milling. The final dispersion had a 3.5% solids concentration with the total solids composed of 50% pigment, 0% PVB and 50% polyester ionomer. The results of Table IV below show that the dispersion is non-Newtonian and sensitive to ultrasonic. TABLE IV

TABLE IV

| Comparative Example | Polyester ionomer | Milling Time | Milling Speed | Viscosity Ratio Fresh | Viscosity Ratio Sonicated | High Shear Viscosity Ratio |
|---|---|---|---|---|---|---|
| 1 | SIP | 6 | 400 | 25.108 | 28.464 | 0.949 |

Effect of PVB Composition

To look at the effect of PVB composition the dispersions outlined in Table VII were made using the same procedure as example 6 of Table II The coating solutions were characterized in the manner described in the previous example—fresh rheology, and rheology after one-hour sonication in a Branson lab sonicator model 1510. Coatings were prepared both before and after sonication and the quality of the coatings was judged from the picture of the coating. The rheology was summarized by the low/high viscosity ratio before and after sonication. The table below shows the rheological parameters along with the assessment of the coating.

TABLE VII

| Example | PVB | Viscosity Ratio Untreated | Viscosity Ratio Sonicated | Coating Appearance Sonicated | Alcohol % | Butyral % | Acetate % | MW |
|---|---|---|---|---|---|---|---|---|
| 11 | BM2 | | 0.644 | dispersed | 12.1 | 85.6 | 2.3 | 100 |
| 12 | B76 | 1.644 | 12.551 | flocculated | 12 | 88 | 0 | 90 |
| 13 | BL1 | 1.407141 | 1.014055 | dispersed | 14.7 | 82.9 | 2.4 | 10 |
| 14 | B72 | 6.060781 | 1.373326 | dispersed | 18.9 | 80 | 1.1 | 170 |
| 15 | BH-6 | 2.766443 | 0.714931 | dispersed | 11.6 | 86.1 | 2.3 | 40 |
| 16 | BL-S | 33.54014 | 85.73857 | flocculated | 7.6 | 89.6 | 2.8 | 10 |
| 17 | BM5 | 2.096386 | 0.63446 | dispersed | 13.6 | 84 | 2.4 | 140 |
| 18 | BMS | 19.4 | 56.6 | flocculated | 8.4 | 89.4 | 2.2 | 80 |
| 19 | BM1 | 1.18 | 2.25 | dispersed | 13.6 | 84 | 2.4 | 60 |

All coatings looked reasonably well dispersed for untreated solutions. Three of the coating solutions were affected negatively by sonication, while the rest were either unaffected or improved in dispersion quality. The three that were negatively affected were BUTVAR B76 PVB, S-Lec BLS PVB and S-Lec BMS PVB, characterized by higher butyral content (88% and above). While the molecular weight (MW) had an effect on the absolute viscosity of the solution, it did not impact the viscosity ratio and the response to sonication. Thus while PVB is a preferred dispersant, it is desirable for the butyral content to be below 88 mole %.

Effects of Solvent

To look at effects of solvents, the dispersions of table VIII were prepared using the same procedure as example 6, except for the solvent. In all cases, the solvents were used in equivalent volume to 1,1,2-trichloroethane. The results are shown in Table IX below. The physical properties of the solvent are shown in table VIII: $\gamma c$, the hydrogen bonding parameter, and the Hillebrand and Hansen parameters for liquid at 25° C., $\delta d$, $\delta p$, $\delta h$, and $\delta t$, the dispersion parameter, the polar parameter, and hydrogen bonding parameter, respectively, whereas $\delta t$, $=\delta d+\delta p+\delta h=$the total cohesive energy. These concepts are fully defined in Handbook of Solubility Parameters and Other Cohesion Parameters by Allan F. M. Barton, CRC Press, 1985.

TABLE VIII

| Example | PVB | Solvent | % Butyral | % Alcohol | MW | Gammac | Density | δd | δp p | δh | δt |
|---|---|---|---|---|---|---|---|---|---|---|---|
| | | | Solvent Properties Solubility parameter | | | | | | | | |
| 20 | BM-2 | Dioxolane | 85.6 | 12.1 | 100 | | 1.06 | 14.8 | 11.3 | 13.9 | 23.2 |
| 21 | BM-2 | 1,1,2 TCE | 85.6 | 12.1 | 100 | 1.5 | 1.435 | 13.9 | 12.9 | 7 | 20.9 |
| 22 | BM-2 | THF | 85.6 | 12.1 | 100 | 9.9 | 0.889 | 13.3 | 11 | 6.7 | 18.5 |
| 23 | BM-2 | Cyclohexanone | 85.6 | 12.1 | 100 | 11.7 | 0.986 | 15.6 | 9.4 | 11 | 21 |
| 24 | BL-S | Dioxolane | 89.6 | 7.6 | 10 | | 1.06 | 14.8 | 11.3 | 13.9 | 23.2 |
| 25 | BL-S | 1,1,2 TCE | 89.6 | 7.6 | 10 | 1.5 | 1.435 | 13.9 | 12.9 | 7 | 20.9 |
| 26 | BL-S | THF | 89.6 | 7.6 | 10 | 9.9 | 0.889 | 13.3 | 11 | 6.7 | 18.5 |
| 27 | BL-S | Cyclohexanone | 89.6 | 7.6 | 10 | 11.7 | 0.986 | 15.6 | 9.4 | 11 | 21 |

TABLE IX (Solvent Results)

| Example | PVB | Solvent | Visc. Ratio untreated | Visc. Ratio sonicated | Coating appearance sonicated |
|---|---|---|---|---|---|
| 20 | BM2 | Dioxolane | 7.85 | 0.81 | dispersed |
| 21 | BM2 | 1,1,2 TCE | 2.17 | 1.27 | dispersed |
| 22 | BM2 | THF | 6.36 | 1.48 | dispersed |
| 23 | BM2 | Cyclohexanone | 0.92 | 1.33 | dispersed |
| 24 | BL-S | Dioxolane | 25 | 110 | flocculated |
| 25 | BL-S | 1,1,2 TCE | 33.5 | 85.7 | Flocculated |
| 26 | BL-S | THF | 40.5 | 78.5 | flocculated |
| 27 | BL-S | Cyclohexanone | 4.2 | 12.24 | flocculated |

The results show that all the solutions made with BM2 PVB as the dispersant are well dispersed and not adversely affected by sonication. The reason that samples 20 and 22 show a relatively high viscosity ratio untreated is because the milling time and speed has not been optimized for these solvents. Also, the percent solids for all these solutions are relatively high (between 4 and 4.5% solids) compared with the previous solutions, which can magnify the viscosity ratio. Upon sonication, the viscosity ratio for all the BM2 PVB samples drops to below 2 and the coating appearance shows a well dispersed solution.

All the solutions made with BLS PVB were shear thinning and the viscosity ratio increased considerably after sonication. The appearance of the coating was deteriorated compared with the coatings made with the unsonicated solutions.

The examples show that a wide variety of solvents can be used to deliver coating solutions that are stable and insensitive to sonication.

Electrophotographic Examples

Electrophotographic photoconductive elements using the CGL dispersions of this invention were prepared according to the following procedures.

A set of 5-mil thick nickel sleeve substrates, 185 mm in diameter, and a set of 7-mil thick nickelized ESTAR (trademark of Eastman Kodak, Rochester, N.Y. for a polyethylene terephthalate film support) are dip coated at 5.20 mm/sec in an ethanol/dichloromethane solution containing 5 wt % AMILAN CM8000 polyamide (available from Toray Chemical Inc. of Japan) to provide a 1.5 micron thick barrier layer, dried at 110° C. for 30 minutes, in a Blue M oven.

Four barrier layer-coated nickel sleeves and four barrier layer-coated nickelized ESTAR sleeves are then dip coated at four different withdrawal speeds respectively in the selected pigment dispersion of this invention.

The coated sleeves are dried at 110° C. for 30 minutes, then coated, as described in U.S. Pat. No. 5,614,342, with a charge-transport layer solution (14 wt. % solids in dichloromethane as solvent) containing the following solids: 2 parts by weight of tri-tolylamine, 2 parts by weight of 1,1-bis(4-di-p-tolylaminophenyl) methane, 1 part by weight of poly[4,4'-(2-norbornylidene) bisphenol terephthalate-co-azelate (60/40), and 5 parts by weight of MAKROLON polycarbonate. The fully coated sleeves are again dried at 110° C. for 30 minutes.

The transparent nickelized ESTAR sleeves are cut and used to assess the optical absorption of the CGL layer at 780-nm and for microscopic evaluation of CGL uniformity.

Effect of Sonication

The selected CGL dispersion of this invention is then subjected to ultrasonic treatment for 30 minutes in a desktop Branson sonicator. One hour after, the CGL dispersion is coated using the procedure described above.

Granularity Measurement

On a NexPress 2100 Press, separate images are made for each of the four colors (CMYK), with three halftone patches, which are two inches square. The average status A density of the three patches are 0.50, .070, and 0.90.

An area of one and a half square inches on each patch is reflection scanned with an Epson 1640XL flat bed scanner at 800 dpi. The scan data is then processed and a density and granularity are calculated for each patch. The final calculation is an interpolated grain at 0.7 status A density.

The theory behind this test can be found in "Measurement of Graininess For Halftone Electrophotography" by Theodore Bouk and Norman Burmingham in Proceedings of the IS&T's Eight International Congress On Advances in Non-Impact Printing Technology, page 508, 1972.

Comparative Example 2

Electrophotographic Evaluation of Sleeves Coated with a Non-Newtonian Dispersion.

To a SZEGVARI attritor type 1SDG, size1, manufactured by Union Process, of Akron, Ohio, 394.2 g of 1,1,2-Trichloroethane, 919.8 g of dichloromethane and 850 g of a 4 wt % of a polyvinyl butyral BUTVAR B76 in 1,1,2-Trichloroethane/Dichloromethane (30:70 wt/wt) were added with the attritor set at 100 RPM, and 136 g of the co-crystalline mixture of TiOPc and TiOFPc: 87.5:12.5 were added to the attritor. After complete addition of the pigment, he attritor speed was increased to 125 RPM. The mixture was milled for three hours.

Then the content of the attritor was discharged into a tared jar, leaving the stainless steel beads behind. The attritor was rinsed twice with 292.7 g of 1,1,2-trichloroethane and 682.9 g of dichloromethane into the same jar. The recovered mill grind was then added, 2550 g of a 4% of the polyester ionomer made from isophthalic acid (95 mole %), 4-sodio-isophthalic sulfonate (5 mole %), diethylene glycol (20 mole %), and neopentyl glycol (80 mole %), in 1,1,2-trichloroethane. To the stirred dispersion, 1.8 g of the surfactant DC-510 from Dow Corning was added. The dispersion was finally filtered with a 40 microns Pall filter.

The dispersion was then characterized using the rheological characterization procedure described above. The viscosity ratio without sonication treatment was 7.9 and after treatment it was 46.2. These results show that this dispersion was non-Newtonian before sonication, and became more so after sonication.

The dispersion was coated to generate photoconductive sleeve elements using the procedure described above. The nickelized ESTAR sleeves were used to measure optical density. The nickel sleeves were use to evaluate image grain using the procedure described above. The results are shown in the Table X below.

TABLE X

| Ctg Speed mm/s | CGL OD | Grain @ 0.7 |
|---|---|---|
| | Before Sonication | |
| 0.8 | 0.33 | 35 |
| 1.2 | 0.65 | 34 |
| 1.4 | 0.71 | 32 |
| 1.6 | 0.99 | 18 |
| | 1 hr. After Sonication | |
| 1.6 | 0.46 | — |

Example 28

Electrophotographic Evaluation of Sleeves Coated with a Newtonian Dispersion.

A dispersion was prepared using the same procedure as comparative example 2, except that:

1,1,2-Trichloroethane was the sole solvent used;

the PVB was S-Lec BM-2;

the rotor was set at 175 RPM; and, the dispersion was milled for six hours.

The resulting dispersion was characterized using the rheological measurement procedure described above. The 0.75 and 0.9 ratios are characteristics of a Newtonian dispersion insensitive to ultrasonic treatment.

The dispersion was then coated into photoconductive sleeve elements using the procedures described above. The results are shown in Table XI

TABLE XI

| Ctg Speed mm/s | CGL OD | Grain @ 0.7 |
|---|---|---|
| | Before Sonication | |
| 1 | 0.63 | 18 |
| 1.4 | 0.82 | 14 |
| 1.8 | 0.97 | 14 |

TABLE XI-continued

| Ctg Speed mm/s | CGL OD | Grain @ 0.7 |
|---|---|---|
| | 1.5 hrs After Sonication | |
| 1 | 0.71 | 14 |
| 1.2 | 0.79 | 16 |
| 1.6 | 0.96 | 14 |

The data from these two examples show that image grain for the non-Newtonian dispersion, is very high at the low optical density. On the other hand the Newtonian dispersion of this invention provides very low image grain even at very low optical density (low CGL coverage). Also when coated just 1.5 hours after sonication, the image grain remain unchanged.

As demonstrated in the examples, the PVB component is a significant component in the coating composition. By the use of the various PVB blends, the properties of the coating composition can be adjusted so that the coating composition is insensitive to sonication so that the coating composition can be subjected to sonication to break up flocculant particles if the coating composition has been standing for a period of time between coating operations and the like. Similarly, high shear could be used to break up the remaining flocculants. In any event, the coating compositions, which are shown to be Newtonian after milling, are readily tested to determine whether the Newtonian character of the composition is changed after sonication. The sonication can be for the various times considered relevant to the anticipated treatments of the coating composition.

The milling times and severity necessary to produce Newtonian coating compositions is readily determined by those skilled in the art by a simple measurement of the properties of the coating composition after treatment. It is readily determined whether the viscosity ratios are indicative of a Newtonian dispersion. This dispersion may then be sonicated and the viscosities run again to determine whether they are still indicative of a Newtonian dispersion. If not, then additional milling for additional time or a variation in the composition within the ranges stated above is required.

The range of compositions and milling conditions shown above are considered to be illustrative to those skilled in the art of the method of the process of the present invention.

For instance particularly in reference to Table II, it is clear that the tests shown with the materials identified as BUTVAR B76 PVB with a milling time of twenty-four hours and a milling speed of 400 rpms produces a suitable ratio in the fresh dispersion and a suitable ratio in the sonicated dispersion. Similarly desirable properties are achieved with S-Lec PVB copolymers BM2 PVB at both six hours and 200 rpms and at six hours and 400 rpms. These test conditions are readily determined by those skilled in the art based upon simple measurement of the viscosities of the resulting dispersion material.

Figure 2:
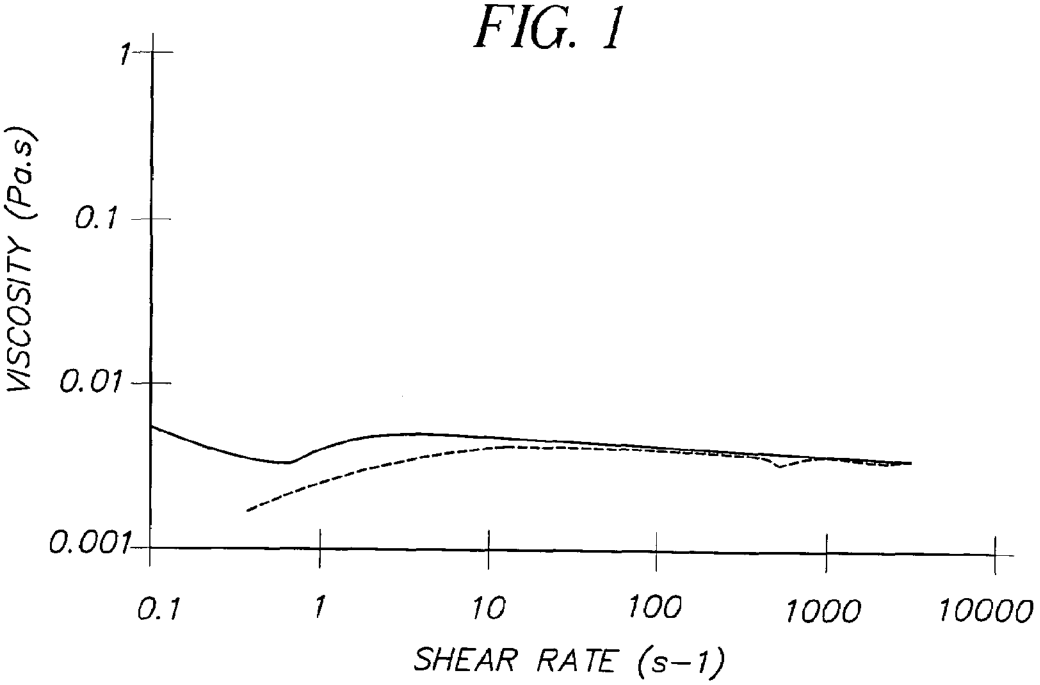
FIG. 2 is a chart showing the viscosity versus shear rate for a Newtonian ultrasonic-insensitive solution. The solid line shows an untreated coating solution and the dashed line shows a solution sonicated in a lab bath for one-hour; and, FIG. 3 is a chart showing the viscosity versus shear rate for a Newtonian solution affected by sonication. The solid line shows the viscosity versus shear rate for an untreated coating solution and the dashed line shows the viscosity versus shear rate for a solution sonicated in a lab bath for one-hour.
Figure 3:
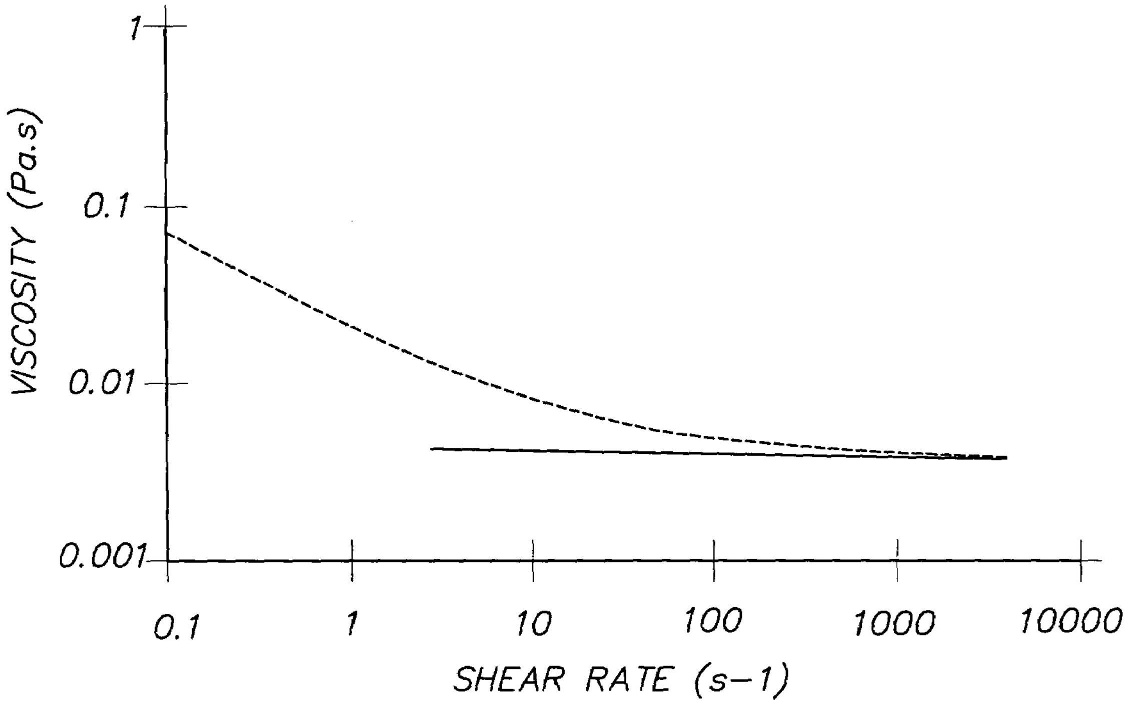

Please note that in FIG. 2, many of the fresh ratios are not within the range of viscosity ratios indicative of Newtonian behavior. These materials are promptly discarded as not suitable for the preparation of the Newtonian ultrasonic-insensitive coating composition. While such materials may be suitable for use for coating applications where the coating composition will be used immediately and completely, they are not suitable for use in applications where the coating solution is allowed to stand between coating operations, such as dip coating and the like.

According to the present invention, a method has been described which is effective to produce a Newtonian ultrasonic-insensitive charge-generation dispersion composition comprising at least one finely-divided pigment, PVB and a polyester ionomer.

An additional consideration is that in some instances, quantities of the solvent used to crystallize the pigment may remain in the coating composition and further solvents may be added as desired to adjust the viscosity and the like. Further it is noted that the molecular weight of the PVB blends used in the composition vary widely. The variation in molecular weight does not appear to be a significant factor with respect to and impact on the viscosity ratio and the response of sonication, but it does have an impact on the absolute viscosity of the solution. Similarly the use of diluting solvents will have an effect on the absolute viscosity of the solution.

It is also noted that while PVB is a preferred dispersant, it is considered desirable for the PVB content of the coating composition to be below about 90 mole %.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A Newtonian, ultrasonic-insensitive charge generation dispersion composition comprising at least one finely-divided pigment, polyvinyl butyral containing moieties of butyral, vinyl alcohol and vinyl acetate wherein the polyvinyl butyral copolymer contains from about 75 to less than 88 mole percent butyral, from about 5 to about 20 mole percent vinyl alcohol and from about 0.5 to about 5 mole percent vinyl acetate and a polyester ionomer wherein the composition has a low shear viscosity (measured at 0.5 s-1) to high shear viscosity (measured at 1000 s-1) ratio from about 1 to about 3.0 and wherein the viscosity ratio is either retained or decreased after sonication.

2. The composition for claim 1, wherein the pigment is present in the composition in an amount equal to from about 30 to about 80 weight percent based upon the weight of the total solid content of the coating composition.

3. The composition for claim 1, wherein the average molecular weight of the polyvinyl butyral copolymer is from about 10,000 to about 170,000 Daltons.

4. The composition for claim 1, wherein the polyvinyl butyral copolymer is present in the composition in an amount equal to from about 2 to about 40 weight percent based upon the weight of the total solid content of the composition.

5. The composition for claim 1, wherein the pigment comprises at least one of the titanium phthalocyanine, titanyl fluorophthalocyanine and mixtures thereof.

6. The composition for claim 1, wherein the polyester ionomer is present in the coating composition in an amount equal to from about 60 to about 98 weight percent based upon the weight of the total solid content of the coating composition.

7. The composition for claim 1, wherein the polyester ionomer is selected from the group of polyester-ionomers having a structure according to formula I:

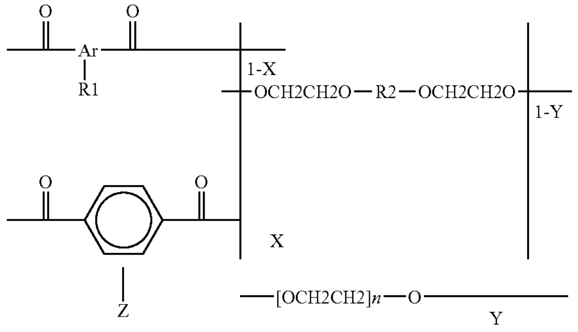

wherein: wherein R1 represents alkyl groups such as methyl, and t-butyl; R2 represents cyclohexyl, 1,4-dimethylenecyclohexane, 4,4'-benzophenone, 4,4'-di-phenylmethane, diphenylsulfone, 4,4'-isopropylidene bisphenylene, 4,4'-hexafluoroisopropylidene bisphenylene, 4,4'-cyclohexylidene bisphenylene, 4,4'-norborn-ylidene bispheylene, 4,4'-indnylidene bisphenylene, and 4,4'-fluorenylidenebis-phenylene; Ar represents an aromatic group containing an asymetric center, i.e., isophthalic acid 1,1,3-trimethy-3(4-carboxyphenyl)-5,5-indancarboxylate, and 3-methylphthalic anhydride, methylsuccinic acid, and 2-ethyl-1,6-hexanedioic acid;

Z represents:

—SO3M:

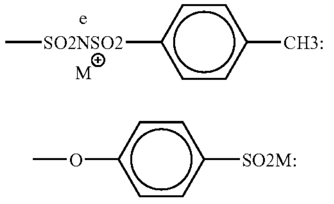

M represents an alkali earth metals such as lithium, sodium or potassium or ammonium, trimethylammonium, triethylammonium, and hydroxylalkylammonium such as dihydroxyethylammonium, and trihydroxyethylammonium; n is an integer of from 2 to 12; X represents from 1 to 30 mole %; and Y represents from 0 to 100 mole %.

8. The composition of claim 7, wherein the polyester ionomer is selected from the group consisting of:

poly{1,4-cyclohexylenedimethylene-co-2,2'-oxydiethylene (46/54)isophthlate-co-5-sodiosulfoisophthlate (95/5)!;
poly{1,4-cyclohexylenedimethylene-co-2,2'-oxydiethylene (46/54)isophthlate-co-5-sodiosulfoisophthlate (90/10)!;
poly{1,4-cyclohexylenedimethylene-co-2,2'-oxydiethylene (46/54)isophthalate-co-5-sodiosulfoisophthalate (85/15)!;
poly{1,4-cyclohexylenedimethylene-co-2,2'-oxydiethylene (46/54)isophthalate-co-5-sodiosulfoisophthalate (80/20)!;
poly{1,4-cyclohexylenedimethylene-co-2,2'-oxydiethylene (46/54)isophthalate-co-5-sodiosulfoisophthalate (75/25)!;
poly{1,4-cyclohexylenedimethylene-co-2,2'-oxydiethylene (46/54)isophthalate-co-5-lithiosulfoisophthalate (90/10)!;
poly{1,4-cyclohexylenedimethylene-co-2,2'-oxydiethylene (46/54)isophthalate-co-triphenylmethylphosphoniumsulfoisophthalate (90/10)!;
poly{1,4-cyclohexylenedimethylene-co-2,2'-oxydiethylene -continued (46/54)isophthalate-co-5-(4-sulfophenoxy)isophthlate (90/10)}; poly{1,4-cyclohexyloxydiethylene terephthalate-co-5-(4-sulfophenoxy)isophthalate (70/30)}; and poly{1,4-cyclohexylenedimethylene-co-2,2'-oxydiethylene -continued (46/54)isophthalate-co-4,4'-dicarboxyphenylmethylphenyl phosphonium p-toluenesulfonate (90/10)!.

* * * * *